(12) United States Patent
Fowlds (10) Patent No.: US 6,399,141 B1
(45) Date of Patent: *Jun. 4, 2002

(54) PRODUCTION OF A FOOD ACID MIXTURE CONTAINING FUMARIC ACID

(76) Inventor: Robert Walter Rycroft Fowlds, 7 Ocean Villa 47 Gusbrown Rd., Warner Beach, 4126 (ZA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/424,556
(22) PCT Filed: May 22, 1998
(86) PCT No.: PCT/GB98/01498
§ 371 (c)(1),
(2), (4) Date: Nov. 24, 1999
(87) PCT Pub. No.: WO98/53705
PCT Pub. Date: Dec. 3, 1998

(30) Foreign Application Priority Data

May 28, 1997 (ZA) ................................. 97/4675

(51) Int. Cl.$^7$ ................................. A23L 1/221
(52) U.S. Cl. .................. 426/650; 426/96; 426/654; 426/518; 426/519
(58) Field of Search ................. 426/590, 96, 99, 426/103, 518, 650, 285, 591, 443, 453, 454, 455, 519, 654

(56) References Cited

U.S. PATENT DOCUMENTS 2,609,298 A * 9/1952 Kirby
3,009,810 A * 11/1961 Raffensperger et al.

(List continued on next page.)

FOREIGN PATENT DOCUMENTS

CN 1204479 A * 1/1999

OTHER PUBLICATIONS

Kirk–Othmer Encyclopedia of Chemical Technology, Fourth Edition, vol. 11, pp. 807–809 (1994).*

Kirk–Othmer Encyclopedia of Chemical Technology, Fourth Edition, vol. 15, p. 916 (1994).*

Varnam et al, "Beverages—Technology, Chemistry, and Microbiology", Chapman and Hall Publishers, London, UK, p. 88, (1994).*

*Primary Examiner*—Nina Bhat
(74) *Attorney, Agent, or Firm*—Michael J. Striker (57) ABSTRACT

A method for the production of a granular, free-flowing, non-dusting food acid composition having a preselected taste profile which can be used as a citric acid replacement in a foodstuff, the method including the steps of combining fumaric acid with an organic acidic material selected from malic acid, tartaric acid, citric acid, lactic acid, ascorbic acid and mixtures of any two or more thereof in an aqueous medium to produce a mixture; and granulating the mixture to produce a food acid comprising a granular product material containing fumaric acid and the organic acidic material, the quantity of fumaric acid and the quantities of the organic acidic material being selected so that the fumaric acid makes up between 5% and 95% of the granular product, the combining step: being selected from one of grinding the fumaric acid in an aqueous solution of the organic acidic material to produce a slurry; and grinding the fumaric acid in an aqueous medium to produce a milled fumaric acid slurry and then adding the organic acidic material to the milled fumaric acid slurry; the granulating step being a spray granulating step which is controlled to produce a free-flowing granular product having a particle size of 20–60 mesh.

18 Claims, 8 Drawing Sheets

U.S. PATENT DOCUMENTS

| | | | |
|---|---|---|---|
| 3,011,894 A | * | 12/1961 | Block et al. |
| 3,016,299 A | * | 1/1962 | Raffensperger et al. |
| 3,030,213 A | * | 4/1962 | Tidridge et al. |
| 3,108,002 A | * | 10/1963 | Raffensperger et al. |
| 3,151,986 A | * | 10/1964 | Van Ness |
| 3,169,872 A | * | 2/1965 | Rau |
| 3,181,953 A | * | 5/1965 | Van Ness et al. |
| 3,181,954 A | * | 5/1965 | Inoue et al. |
| 3,245,798 A | * | 4/1966 | Van Ness |
| 3,248,226 A | * | 4/1966 | Stewart, Jr. |
| 3,250,624 A | * | 5/1966 | Van Ness |
| 3,328,173 A | * | 6/1967 | Van Ness et al. |
| 3,330,665 A | * | 7/1967 | Van Ness et al. |
| 3,351,471 A | * | 11/1967 | Demler et al. |
| 3,370,956 A | * | 2/1968 | Reitman et al. |
| 3,416,930 A | * | 12/1968 | Irani |
| 3,470,213 A | * | 9/1969 | Marquis |
| 3,506,453 A | * | 4/1970 | McCarron |
| 3,523,024 A | * | 8/1970 | Nesty |
| 3,580,726 A | * | 5/1971 | Dame |
| 3,600,191 A | * | 8/1971 | Stewart, Jr. et al. |
| 3,634,094 A | * | 1/1972 | Ponzoni et al. |
| 3,657,010 A | * | 4/1972 | Mitchell et al. |
| 3,660,107 A | * | 5/1972 | Mayer |
| 3,716,374 A | * | 2/1973 | Pitchon |
| 3,899,598 A | * | 8/1975 | Fischer et al. |
| 3,939,289 A | * | 2/1976 | Hornyak et al. |
| 4,066,791 A | * | 1/1978 | Corbin, Jr. |
| 4,343,819 A | * | 8/1982 | Wood et al. |
| 4,384,005 A | * | 5/1983 | McSweeney |
| 4,537,784 A | * | 8/1985 | Percel et al. |
| 4,568,553 A | * | 2/1986 | Murray et al. |
| 4,588,602 A | * | 5/1986 | Brown et al. |
| 4,594,255 A | * | 6/1986 | Wilson et al. |
| 4,622,227 A | * | 11/1986 | Saleeb et al. |
| 4,663,177 A | * | 5/1987 | Weaver et al. |
| 4,707,366 A | * | 11/1987 | McSweeney |
| 4,769,244 A | * | 9/1988 | Lavie |
| 4,882,161 A | * | 11/1989 | Scheurer et al. |
| 5,064,656 A | * | 11/1991 | Gergely et al. |
| 5,077,310 A | * | 12/1991 | Yamashita et al. |
| 5,681,569 A | * | 10/1997 | Kuznicki et al. |
| 5,831,123 A | * | 11/1998 | Gergely et al. |
| 5,993,880 A | * | 11/1999 | Frost et al. |
| 6,054,160 A | * | 4/2000 | Gawad et al. |

* cited by examiner

PRODUCTION OF A FOOD ACID MIXTURE CONTAINING FUMARIC ACID

This application claims benefit under 35 USC 371 of PCT/GB98/01498, filed May 22, 1998.

BACKGROUND OF THE INVENTION

This invention relates to a method for the production of a food acid and to a food acid produced in accordance with the method.

U.S. Pat. No. 3,506,453 describes agglomerated fumaric acid compositions prepared by mixing finely divided components with just enough liquid to cause the component surfaces to become tacky. The components are then contracted with humid air stream and the components agglomerate to form a porous agglomerated product.

According to a first aspect of the invention there is provided a method for the production of a food acid, the method including the steps of combining fumaric acid with an organic acidic material selected from malic acid, tartaric acid, citric acid, lactic acid, ascorbic acid and mixtures of any two or more thereof in an aqueous medium to produce a mixture; and drying the mixture to produce a food acid comprising a particulate material containing fumaric acid and the organic acidic material, the quantity of fumaric acid and the quantities of the organic acidic material being selected so that the fumaric acid makes up between 5% and 95% of the particulate material, the combining step being selected from one of admixing finely divided fumaric acid with an aqueous solution of the organic acidic material; grinding the fumaric acid in the presence of an aqueous solution of the organic acidic material to produce slurry; and grinding the fumaric acid in an aqueous medium to produce a milled fumaric acid slurry and then adding the organic acidic material to the milled fumaric acid slurry.

The percentage compositions given in this specification refer to percentage compositions by mass.

Preferably, the quantity of fumaric acid and the quantity of the organic acidic material will be selected so that the fumaric acid makes up between about 40 and 60% of the particulate material, and more preferably between about 45 and 55%.

The fumaric acid may be cold water soluble (or CWS) fumaric acid. Cold water soluble fumaric acid refers to finely ground fumaric acid which includes a small amount of a wetting agent of the type marketed as CWS fumaric acid by Haarmann and Reimer or a granular fumaric acid material of the type marketed by NCP Food Products as granular cold water soluble fumaric acid.

The organic acidic material may be selected from malic acid, tartaric acid, citric acid, lactic acid, ascorbic acid and mixtures of any two or more thereof. Preferably the organic acidic material will be a mixture of malic acid and tartaric acid. The organic acids are thus water-soluble edible acids i.e. acids permitted in foods.

The quantity of malic acid may be selected so that the malic acid makes up about 40–60% of the particulate material and preferably about 50%. The quantity of tartaric acid may be selected so that the tartaric acid makes up about 3–10% of the particulate material and preferably about 5%.

The method may thus involve admixing finely divided fumaric acid with an aqueous solution of malic acid and tartaric acid. The admixing step may include grinding the fumaric acid in the presence of the aqueous solution of the malic acid and tartaric acid to provide the slurry or grinding the fumaric acid in the aqueous medium and then adding or blending the malic acid and tartaric acid into the milled fumaric acid slurry or spraying an aqueous solution of malic acid and tartaric acid, or spraying separate solutions of malic acid and tartaric acid, onto fumaric acid in powder form.

Thus the combining step may include admixing finely divided fumaric acid with an aqueous solution of malic acid and tartaric acid. Instead, the combining step may include grinding the fumaric acid in the presence of an aqueous solution of malic acid and tartaric acid to produce a slurry. Instead, the combining step may include grinding the fumaric acid in an aqueous medium to produce a milled fumaric acid slurry and then adding or blending the malic acid and tartaric acid into the milled fumaric acid slurry. Instead, the combining step may include spraying an aqueous solution of malic acid and tartaric acid onto fumaric acid in powdered form. Instead, the combining step may include spraying separate aqueous solutions of malic acid and tartaric acid onto fumaric acid in powder form.

The grinding step may be conducted in a wet mill so that the mixture is in the form of a slurry in which the particle size of essentially all the solid material in the slurry is not greater than 150 microns (100 mesh) and the average particle size is between about 100 and 25 microns (150–500 mesh). Preferably, the grinding step is conducted so that the particle size of essentially all of the solid material in the slurry is not greater than 100 microns (150 mesh) and the average particle size is between about 75 and 25 microns (200–500 mesh).

The drying step may include spray drying or spray granulating the slurry. Thus the drying step may be selected from spray drying and spray granulating. In particular, the drying step may be a spray granulating step which is conducted in a fluid bed granulator by a continuous or a batch process to give a free-flowing non-dusting product. The spray granulation step may be controlled such that granules of 20–60 mesh, preferably 30–45 mesh are produced directly, or are selected from the product by screening, with the rejected material being reprocessed.

The final particle size is typically controlled by screening or sifting, to remove oversize particles which are then ground finely in a mill and returned to the fluidized bed of the granulator. Undersized particles are also removed by screening or sifting and are then returned to the fluidized bed. Further, when the drying step is conducted by a continuous process, a certain amount of material segregation of the particles takes place as the smaller particles are lifted higher and tend to come into contact with more of the fresh solution/slurry being sprayed into the bed, and consequently grow in preference to the larger particles which remain in the lower reaches of the bed. The overflow of the bed is generally situated near the bottom of the bed to remove the larger particles. In this way, the final particle size is controlled between about 20 and 100 mesh (840–150 microns) and ideally between about 24 and 60 mesh (700–250 microns).

The particulate material may, after the spray granulation step, be dried to a moisture level of less than 0,5% and preferably less than 0,25%.

Thus, the mixture may be dried to produce a particulate material having a moisture level of less than 0,5%, and preferably less than 0,25%.

The combining step may be conducted in the presence of a wetting agent or surfactant. The wetting agent may, for example, be dissolved in the aqueous medium so that the particulate material which is produced is uniformly mixed with the wetting agent. The admixing step may, further, be conducted in the presence of an anti-foaming agent. The anti-foaming agent may also be dissolved in the aqueous solution.

The wetting agent may be a liquid wetting agent. Such a liquid wetting agent will typically be edible and essentially tasteless. It may, for example, be a liquid alkyl sulphosuccinate such as dioctyl sodium sulphosuccinate, sodium lauryl sulphate, Tween (trade name) or any other suitable edible wetting agent or surfactant. The anti-foaming agent may be a silicone anti-foaming agent. It may, for example, be a food grade silicone oil anti-foaming agent.

The quantity of the wetting agent may be selected so that it comprises about 0,1–0,5% of the final product i.e. of the food acid. The quantity of the anti-foaming agent may be selected so that it controls foam during he admixing and drying steps and comprises about 2–20 ppm preferably about 5–15 ppm and most preferably about 10 ppm of the final product i.e. of the food acid.

The method may include the further step of incorporating an additive selected from flavourants, colourants, sweeteners and mixtures of two or more thereof in the food acid. Typically the additive will be sprayed onto the mixture during the spray-drying or spray-granulating step.

The invention extends to a food acid in particulate form produced by a method as hereinbefore described.

The invention extends further to a food acid in particulate form, the food acid comprising a composite material which includes fumaric acid in an amount of about 5%–95%, malic acid in an amount of about 5–95% and tartaric acid in an amount of about 3–15%.

BRIEF DESCRIPTION OF THE DRAWINGS

The invention is now described, by way of Example, with reference to the accompanying Examples and the Figures in which the words "composite acid" and "composite" refer to the food acid of the invention. In the figures

The present invention is explained in detail herein below by means of examples.

EXAMPLE 1

Malic acid (40 kg), dl-tartaric acid (4 kg) and dioctyl sulphosuccinate wetting agent (Zenith DSS, 100 g) were dissolved in warm water (130 kg) to produce a solution. Crystalline fumaric acid (36 kg) was added to the solution and the resultant slurry was milled in a Chicago Boiler attritor mill for two hours. In other embodiments, the mill was an EHP Series Supermill supplied by Premier Mill or Oliver and Battle. A silicone anti-foaming agent (AF 1510, sourced from Bob Larson Silicones, five drops) was used to control foaming during the milling process. A starter-bed of crystalline tartaric acid (200 g) was added to a GLATT GPCG—60 batch spray-granulator fitted with a triple spray nozzle and the milled slurry was sprayed onto the starter bed at 70–130 /h over 130 minutes so that the temperature in the fluidized bed was maintained at 50–60° C. The mill was a 22 kW unit which was approximately 1300 mm high with a diameter of approximately 800 mm and a tip speed of the impeller of 13 m/s. The granulator settings were:

spray-air pressure 2,5 bar inlet air temperature 100° C.

air flow 2200 m$^3$ /h

The product was then dried by further fluidization for 30 minutes and cooled by fluidization for 5 minutes in cold air to a bed temperature of 40° C.

EXAMPLE 2

Example 1 was repeated using water (60 kg) and a starter bed of the product from Example 1 (10 kg). The bed temperature during the granulation process was maintained at 52–57° C. The product contained 0,21% water by mass and 81,4% by mass was in the size range 841–250 microns. The bulk density was 690–774 kg/m$^3$.

Figure 1:
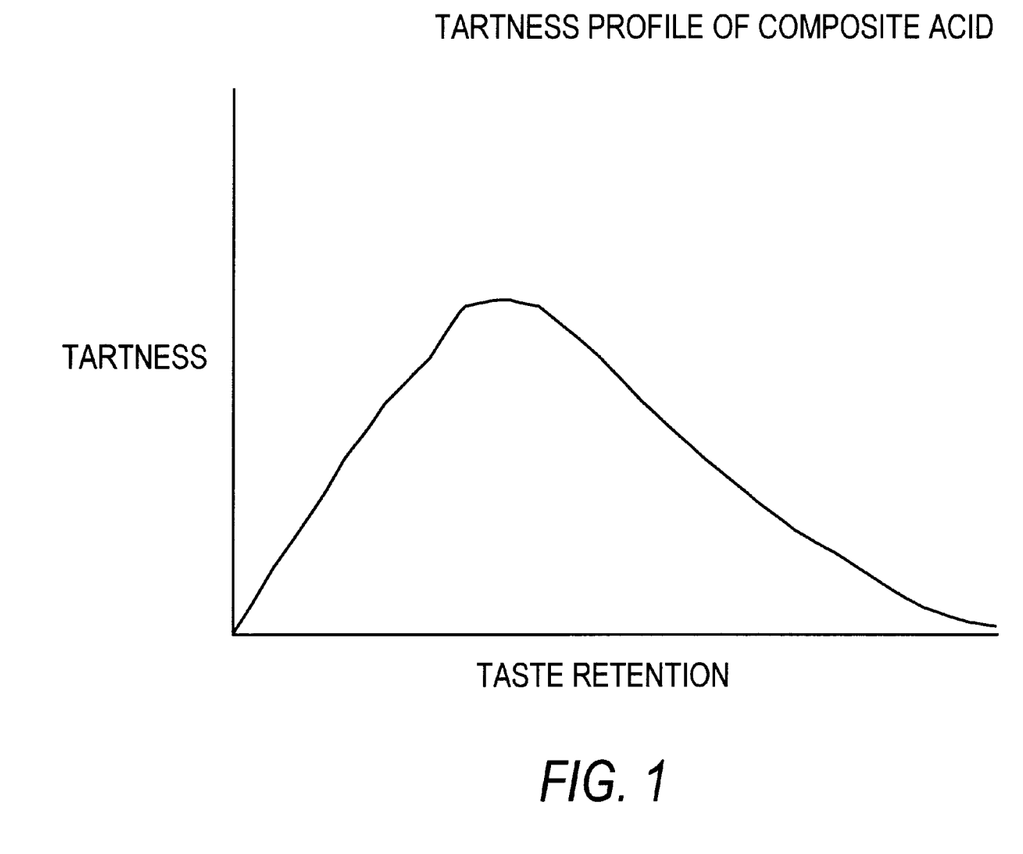
FIG. 1 shows the expected tartness profile of the composite acid.

The acid taste profile of the granular product produced by the method of Example 1 is set out in FIG. 1.

EXAMPLE 3

The following food grade ingredients were added to a mixing vessel fitted with an agitator at the rates indicated, and mixed:

| | |
|---|---|
| Tartaric Acid | 50 kg/hour |
| Malic Acid | 500 kg/hour |
| Fumaric Acid | 450 kg/hour |
| dioctyl sulphosuccinate wetting agent (70%) | 2,25 kg/hour |
| Silicone oil anti-foaming | 15 g/hour |
| Water | 500 l/hour |

The mixing vessel had a capacity of about 1500 and was sufficiently large to allow adequate mixing and time for the soluble ingredients to dissolve. Only the fumaric acid did not dissolve, so that a slurry was formed.

The slurry was fed continuously into a Premier type wet mill in which it was milled. The milled slurry was then pumped directly under pressure into an APV Anhydro continuous drier/granulator unit using a positive displacement pump where granulation and initial drying of most of the moisture (down to about 1% residual) took place in a fluidized bed in the first stage of the unit. The first stage comprised a round generally squat vessel, into which the slurry was pumped continuously under pressure through a nozzle into a fluid bed. This process was carried out optionally with or without atomizing compressed air. The fluid bed was suspended above a screen plate by a hot air stream. The bed was fluidised with hot air at about 65° C. at superficial velocities used in fixed fluid beds, which are typically in the range of 0,3–2,4 m/s.

The height of the bed was controlled by the volume and pressure of the air entering the chamber from under the screen, while the volume and residence time of the product in the fluid bed was maintained at set conditions by allowing a certain quantity to exit the bed through a rotary outlet valve, and enter a second stage. The outlet air from the first chamber was passed from the top of the vessel through a cyclone to remove entrained product fines which were returned to the fluidized bed where they came into contact with the inlet spray and other particles in the bed. This assisted in regulating the product particle size range by returning the fines to the bed to grow into larger granules. The second stage consisted of a mechanically vibrated rectangular fluid bed, or optionally a stationary fluid bed, at a slight angle, where the product is moved forward by air flows, where additional drying and subsequent cooling took place. Both the hot and cold air streams were collected with the fines that were removed by the cyclone and again returned to the fluid bed of the first chamber. Additional additives such as flavourants, colourants and/or sweeteners were optionally incorporated by spraying the additive onto the granules in the second stage.

The dried and cooled product from the second stage, having a low residual moisture content of typically less than 0,3% overflowed a weir which maintained a predetermined residence time, onto a screen where oversize particles were removed and ground up before being returned to the fluid bed of the first stage, together with the undersize fines which were screened out. The screening machine controlled the final particle size of the product, while extraction ducts from the top of the second stage unit further classified the product by drawing off fines and dust which was removed from the air stream by the cyclone and returned to the fluid bed of the first stage granulator.

DISCUSSION

Food acids are generally used to provide a pleasant, refreshing acidic taste to foods, drinks and beverages. They also serve as preservation aids by lowering the pH of the foodstuff to which they are added thereby reducing the activity of possibly harmful micro-organisms. Citric acid has been used for this purpose for many years.

Figure 2:
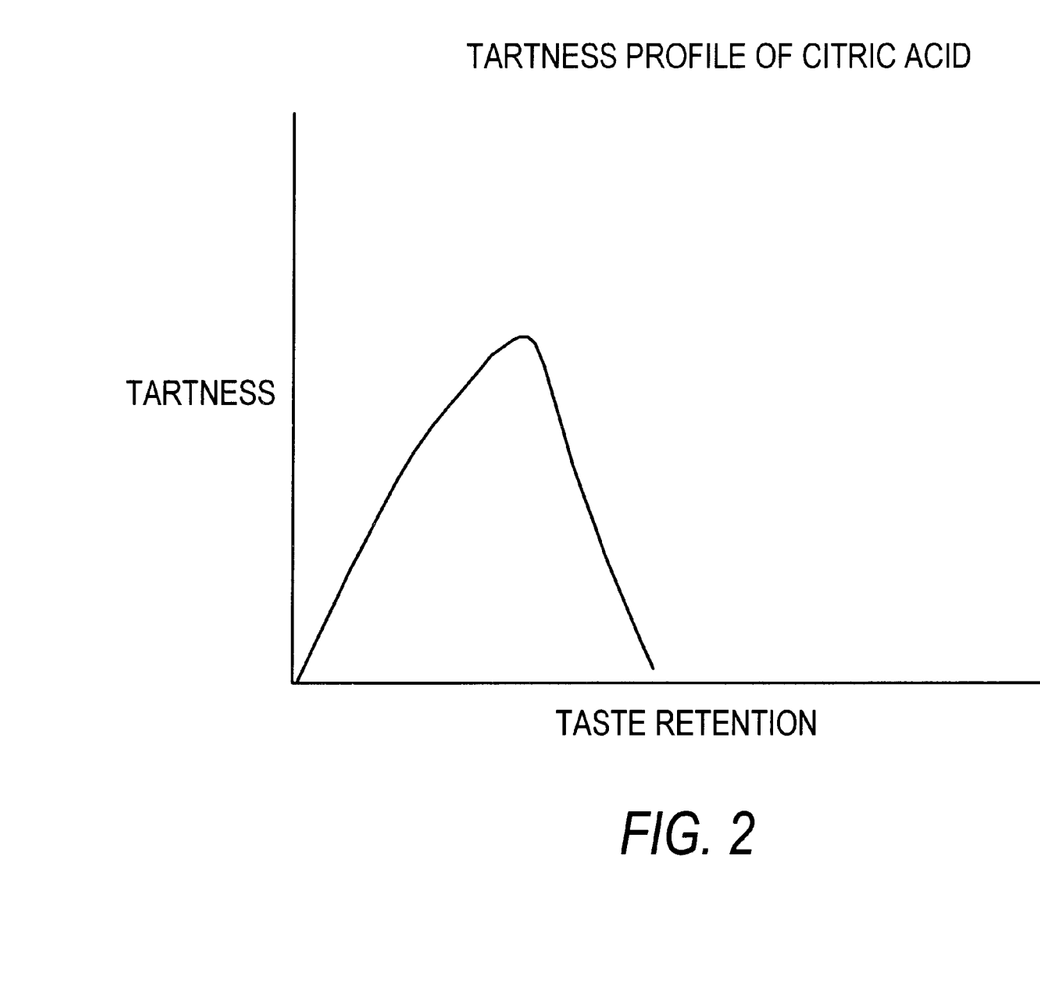
FIG. 2 shows the tartness profile of citric acid.

The acid taste profile of citric acid, as set out in FIG. 2, can be described as a rapid "burst" of tartness which reaches a peak acid taste fairly early, with the taste falling off and disappearing quite rapidly thereafter. The sharp, strong acidic taste of citric acid tends, however, to overpower the flavour of sweeteners and flavourants in a foodstuff to which citric acid has been added. The relatively rapid loss of tartness results in a bitter aftertaste if certain synthetic high-intensity sweeteners are used in the foodstuff in conjunction with the citric acid. Citric acid suffers from further disadvantages in addition to its very strong, sharp taste and short-lived tartness flavour. For example, when used in dry powders, such as soft drink or beverage mixes, it tends to cake due to its hygroscopic nature. It is also generally not free-flowing and has an uneven particle size. Despite these drawbacks, citric acid is by far the most commonly used food acidulant.

Figure 3:
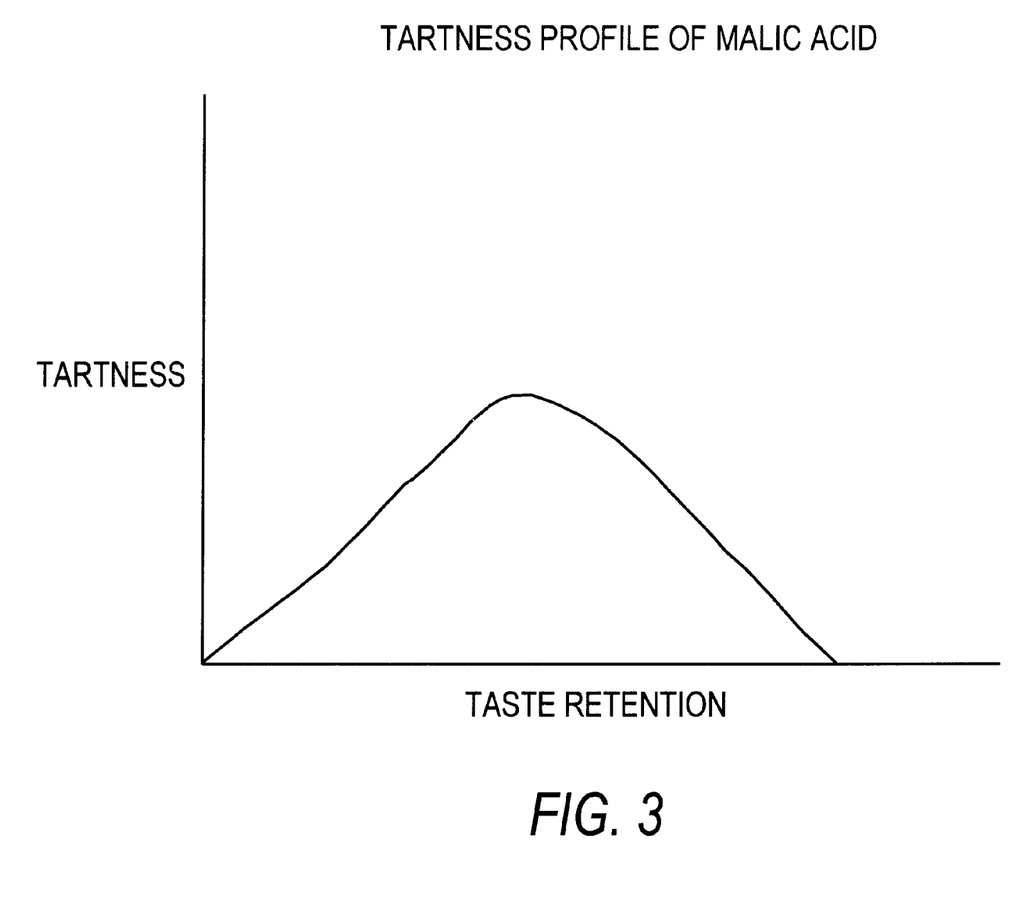
FIG. 3 shows the tartness profile of malic acid.

Malic acid, which is as soluble as citric acid, has a tartness taste profile as shown in FIG. 3. The taste profile is described as not being as sharp as citric acid but as being longer lasting. Malic acid therefore tends to mask the bitter aftertaste of synthetic sweeteners used in conjunction with malic acid. The slower increase to peak tartness does not overpower the taste of the sweeteners with the result that less sweetener need be used (this has been found to be the case with aspartame). In taste tests, it has been claimed that flavourants meld more effectively with malic acid. However, the initial sharpness associated with citric acid is preferable in some end products such as citrus flavoured drinks.

Figure 4:
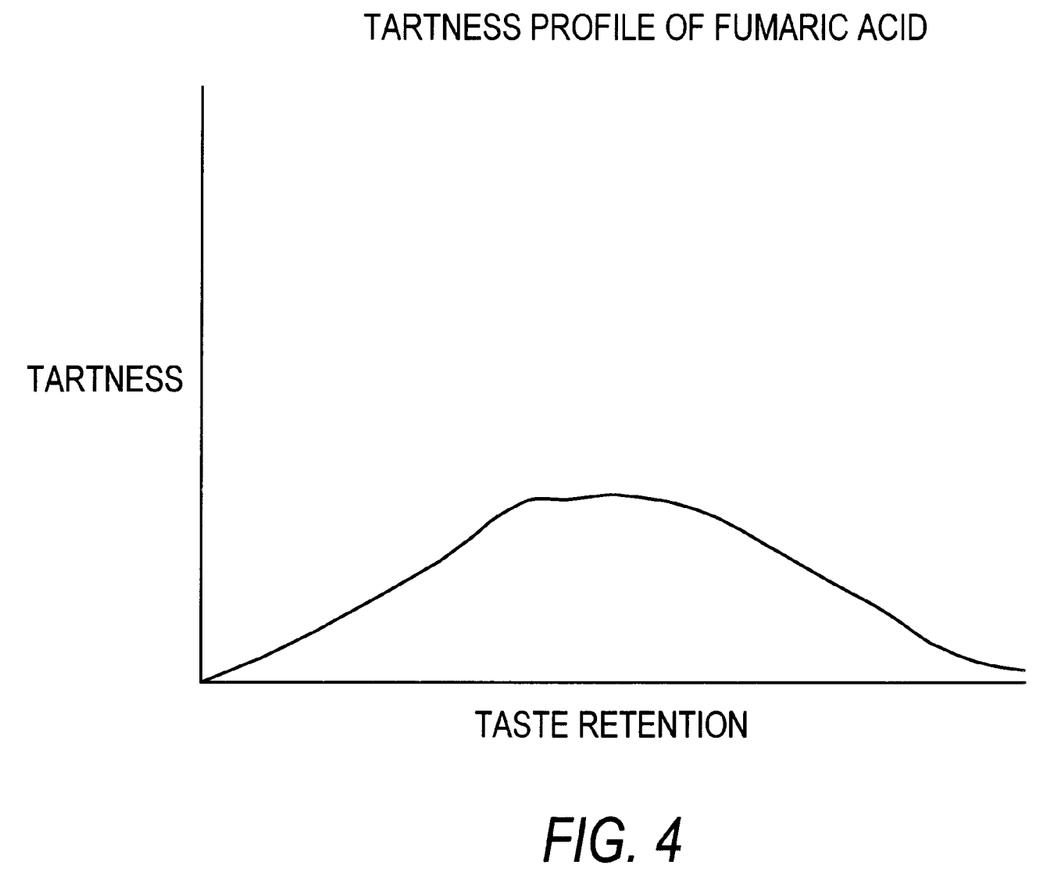
FIG. 4 shows the tartness profile of fumaric acid.

Fumaric acid has a tartness profile which is flatter than that of either citric acid or malic acid but is longer lasting as can be seen in FIG. 4. The longer lasting taste means that fumaric acid effectively appears to be a "stronger" food acid and consequently less fumaric acid is required to achieve a required level of tartness than is required in respect of other food acids. However, although fumaric acid is generally one of the cheapest of the food acids, it has a low solubility in water and a tendency to dissolve slowly unless it is supplied for example as a very fine powder including a wetting agent i.e. so-called cold water soluble, or CWS fumaric acid of the type described above or a granular cold water soluble fumaric acid as described above. All other so-called cold water soluble fumaric acids of which the Applicant is aware are very dusty and hence unsuitable for many applications.

Figure 5:
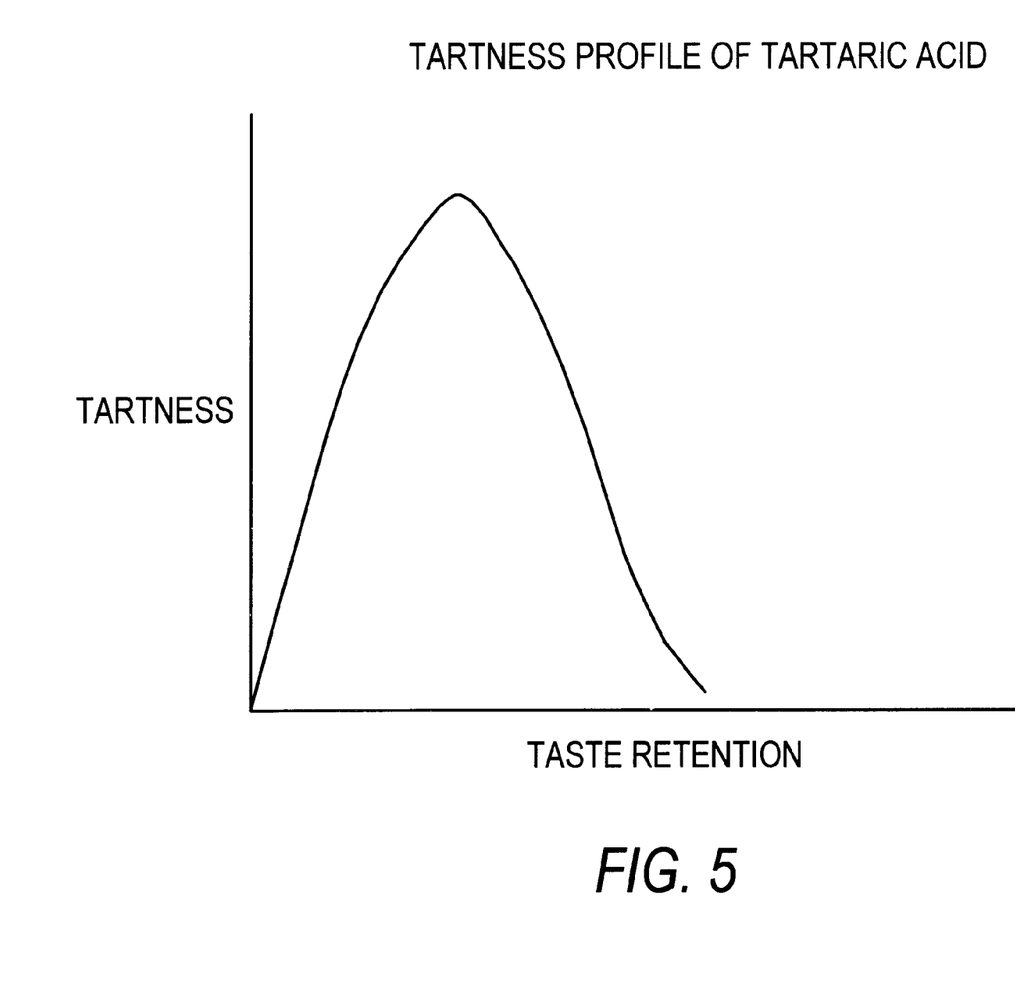
FIG. 5 shows the tartness profile of tartaric acid.

The tartness profile of dl or l tartaric acid as can be seen in FIG. 5 is smoother than that of citric acid. It has a peak acid taste which is higher than that of citric acid and which is longer lasting. Tartaric acid is generally the most expensive of the commonly used food acids. The l-tartaric isomer is, however, hygroscopic and consequently tends to cake.

The tartness sensory profiles as set out in FIGS. 1–5 were gleaned from the literature. A typical method for determining these profiles is based on a software package TASTE (Ver 9.1, 1992) developed by Reading Scientific Services Limited, The Lord Zuckerman Research Centre, The University of Whiteknights, READING, UK.

In order to obtain an equi-acidic taste point of the acid composite relative to citric acid monohydrate, a panel was screened and trained. Equi-acid concentrations are the concentrations of food acids at which both have the same perceived tartness and acidity to the taste. Screening consisted of testing the panel on the four basic tastes (sweet, sour, salt and bitter) and several sets of concentration series to determine the threshold value of the group, according to Jellinek, 1985. Triangle tests were performed to determine each panel member's threshold value for each basic taste according to ASTM Standards. Subsequently the twelve members most sensitive to the bitter taste were selected as part of the acid taste panel. The sets of concentration series used in the training, were used as an indication of the range of the concentration series to be used in the equi-acidic taste analysis.

CSIR supplied the sets of concentration series for the equi-acid taste analysis. If the series was too low or too high to cover the range in which the citric acid's acidic taste point falls, a higher or lower series was requested and used. The most applicable series with a range of five concentration levels was repeated at least three times. The concentration of the citric acid was 0.2%. Samples were presented in random order pairs with the 0.2% citric acid, in ascending order of concentration, with two pairs per session with a break of 20 minutes between sessions to combat sensory panel fatigue. Instant custard was used as palate cleanser between sessions. All samples, water and custard were served at ambient temperature (19.4–22.3° C.). Samples were tasted in individual temperature controlled taste booths under normal white light.

The results obtained were statistically analysed by the ARC-Agrimetrics Institute, using Genstat 5, Release 3.1 (1993). The equi-acid concentrations were as follows:

| ACID | EQUI-ACID CONCENTRATION DETERMINED (% m/v) |
| --- | --- |
| Citric acid Monohydrate | 0.2 |
| Acid Composite | 0.125 |

The above clearly shows a saving in usage. The concentrations reflect a saving of 37.5% compared to citric acid monohydrate and a saving of 33.5% when compared to citric acid anhydrous. These savings will vary depending on the flavour characteristics of the product.

These tests were followed by a comparison of the flavour characteristics of citric acid to the acid composite. The panel was trained using test acid solutions at equi-acidic taste point, and products like acetic acid, unripe bananas, cold black tea and various cordials and soft drinks. This training introduced the panellists to possible descriptive terms typical for acids. The attributes shown in Table 1 were generated and defined by the panel during training sessions. Samples were presented in the same procedure as above. The statistical analyses were collected in a spreadsheet using Quattro Pro (V 5.0) and a statistical programme, STATGRAPHICS (V 5.0) was used to analyse the data using one-way analysis of variance (ANOVA), with acid as the main effect.

TABLE 1

| ATTRIBUTES | DEFINITION |
| --- | --- |
| SOURNESS | Basic taste on the tongue as associated with acids |
| SHARPNESS | A burning, harsh taste on the tongue |
| ASTRINGENT | The feeling factor on the tongue and oral cavity described as puckering/dry and associated with tannins, strong tea, unripe bananas and grape skin |
| BRIGHTNESS/ REFRESHING | The refreshing, clean sensation of the acid associated with water with a few drops of fresh lemon juice. (The opposite of dull, without any sparkle/"still") |
| DUSTINESS | Taste associated with the powdery nasal sensation of dry dust and chalk |
| DISPRIN | Taste associated with medicine, e.g. Disprin or aspirin |
| MOULDY | Taste associated with closed air/water spaces such as water from a closed plastic water container stored at ambient temperature for a long period of time |
| BITTER | Basic taste on tongue stimulated by solutions of e.g. caffeine |
| THROAT IRRITATING | Burning sensation felt in the throat after swallowing of the sample |
| AFTER-TASTE | Taste in mouth after swallowing (panellists asked to describe/comment on taste) |

From the results obtained it was found that there were no significant differences between any of the sensory-related variables for citric acid (0.2% w/v) or the acid composite at their equi-acidic point.

Therefore it can be concluded that the special combination of the three acids in the composite acid can very closely match the tartness sensory profile of citric acid across the various attributes measured at equi-acidic concentrations.

Figure 6:
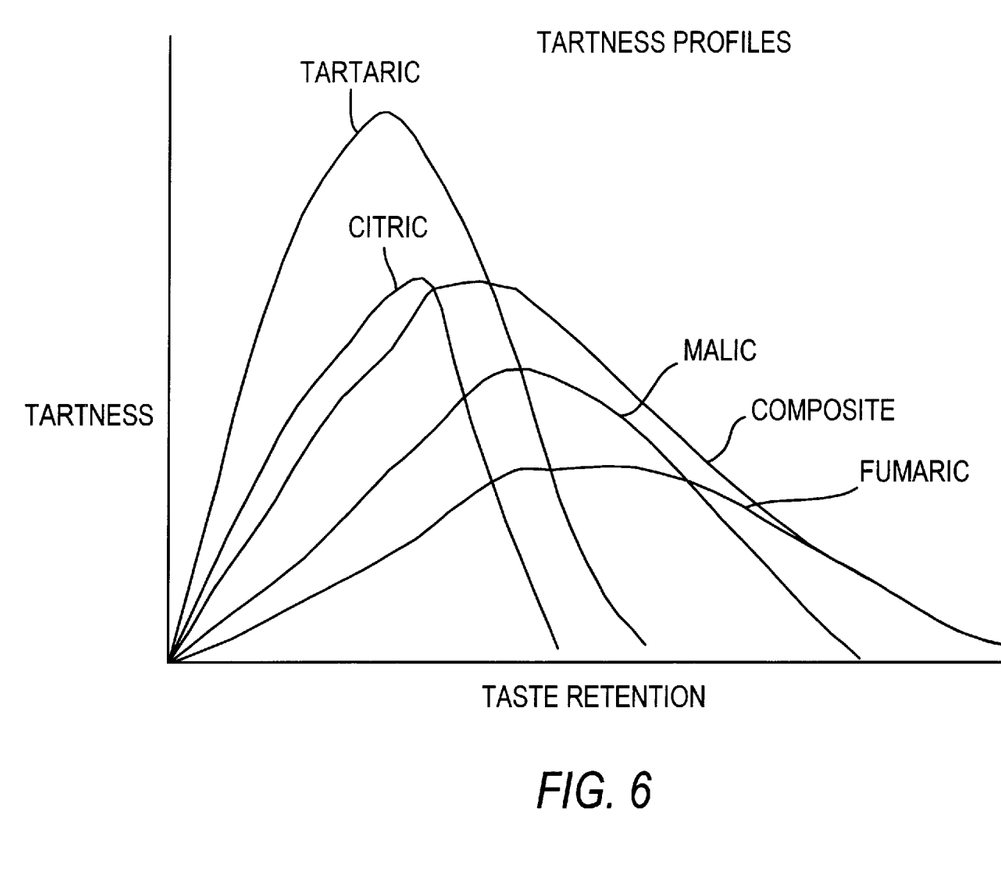
FIG. 6 shows a superposition of the tartness profiles of FIGS. 1 to 5 and the expected tartness profile of the composite acid.
Figure 7:
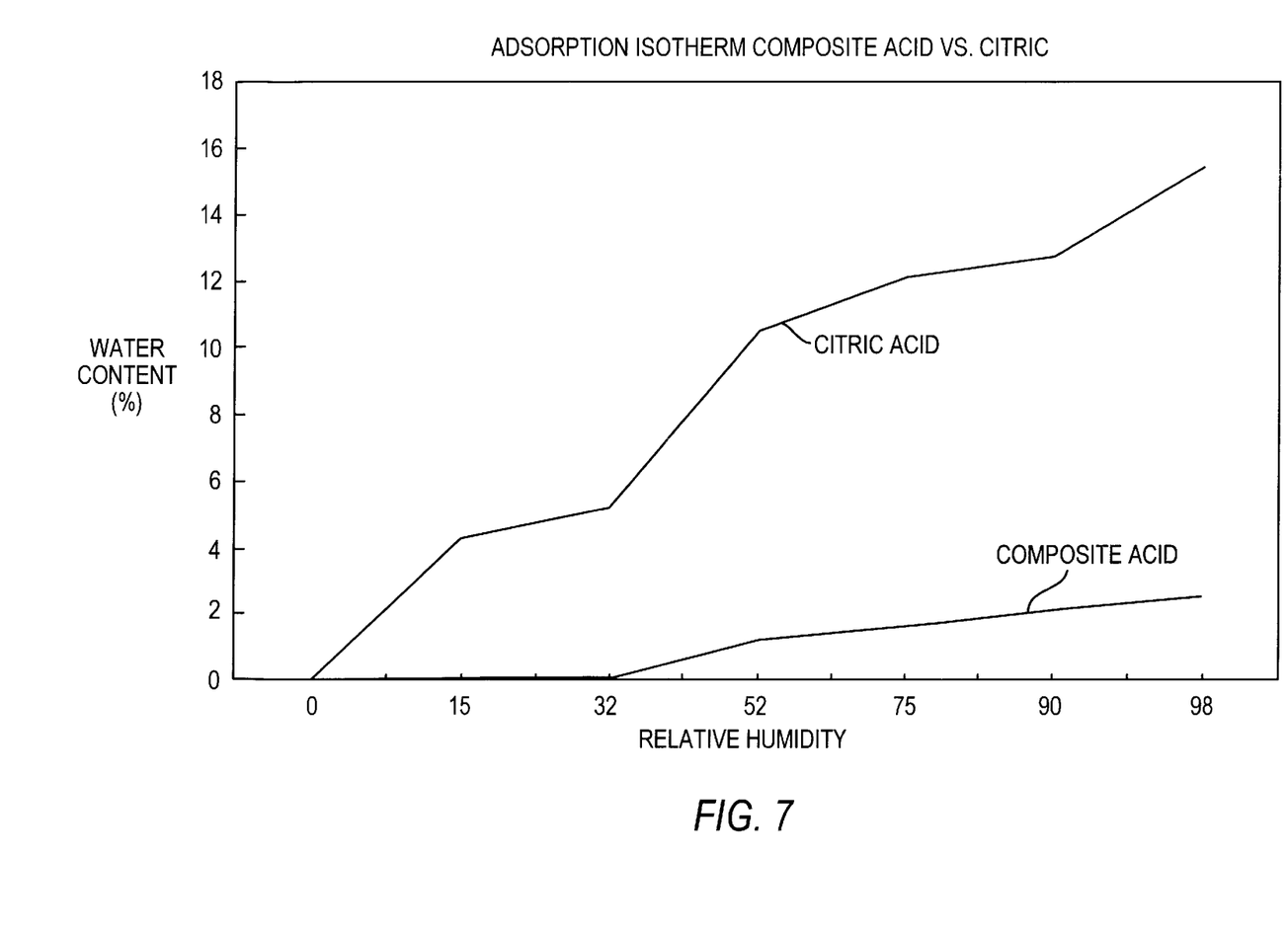
FIG. 7 shows adsorption isotherms of the composite and citric acid.

The Applicant has found that by using malic acid, fumaric acid and tartaric acid together, it is possible to overcome the claimed disadvantages of citric acid and the individual disadvantages associated with malic, fumaric and tartaric acids and to provide a composite granule, containing each of the acids, which has an improved tartness taste profile. It is expected that the sensory tartness profile of the composite acid compared to the other food acids will closely resemble that shown in FIG. 6. The invention thus allows the replacement of hygroscopic citric acid with a non-hygroscopic granular composite mixture of malic acid, dl-tartaric acid (or l-tartaric acid if dl-tartaric acid is not a permitted food acid or is not available) and fumaric acid (all of these acids are food grade and non-hygroscopic in the composite granular form of the present invention). Empirical data clearly indicate the hygroscopic nature of citric acid compared to the relatively non-hygroscopic properties of the composite acid when tested under control conditions as by the Sorption Isotherm Measurements done by the CSIR, as can be seen in FIG. 7. The small quantity of tartaric acid present in the composite granule provides a sudden "burst" of tartness similar to that of citric acid while the major portion of malic acid, which is very soluble, provides a smooth acid flavour. The slow solubility of fumaric acid can be overcome by using cold water soluble (CWS) fumaric acid and the low solubility of fumaric acid is overcome by selecting the quantity of fumaric acid in the composite granule so that the selected quantity will be soluble in the amount of water to be used.

Citric acid alone has the following drawbacks. It is hygroscopic and tends to cake. It is not free-flowing, has an uneven particle size, an overpowering initial sharp taste and a short-lived tartness flavour.

Furthermore, blends of acids generally have an uneven distribution of components and separation (stratification) of the components due to differing particle size and differing specific gravity frequently takes place. Such blends also have an irregular appearance.

The presence of fumaric and malic acids in the granular product also results in a saving in the overall quantity of acidulant required when compared to citric acid and provides a longer lasting acid flavour.

TABLE 2

Mean Scores for Citric Acid in comparison to Acid Composite at Epui-Acidic Point

| SENSORY ATTRIBUTES | CITRIC ACID MONOHYDRATE | ACID COMPOSITE |
| --- | --- | --- |
| Sharpness | 4.53 | 4.83 |
| Astringent | 4.03 | 3.69 |
| Brightness/Refreshing | 3.53 | 4.80 |
| Dustiness | 1.28 | 1.29 |
| Disprin | 2.44 | 2.40 |
| Mouldy | 1.67 | 1.06 |
| Bitter | 1.86 | 1.49 |
| Throat Irritating | 1.08 | 1.06 |
| After Taste | 1.08 | 1.06 |

Where, for all the attributes: 1=None; 8=Extremely

Figure 8:
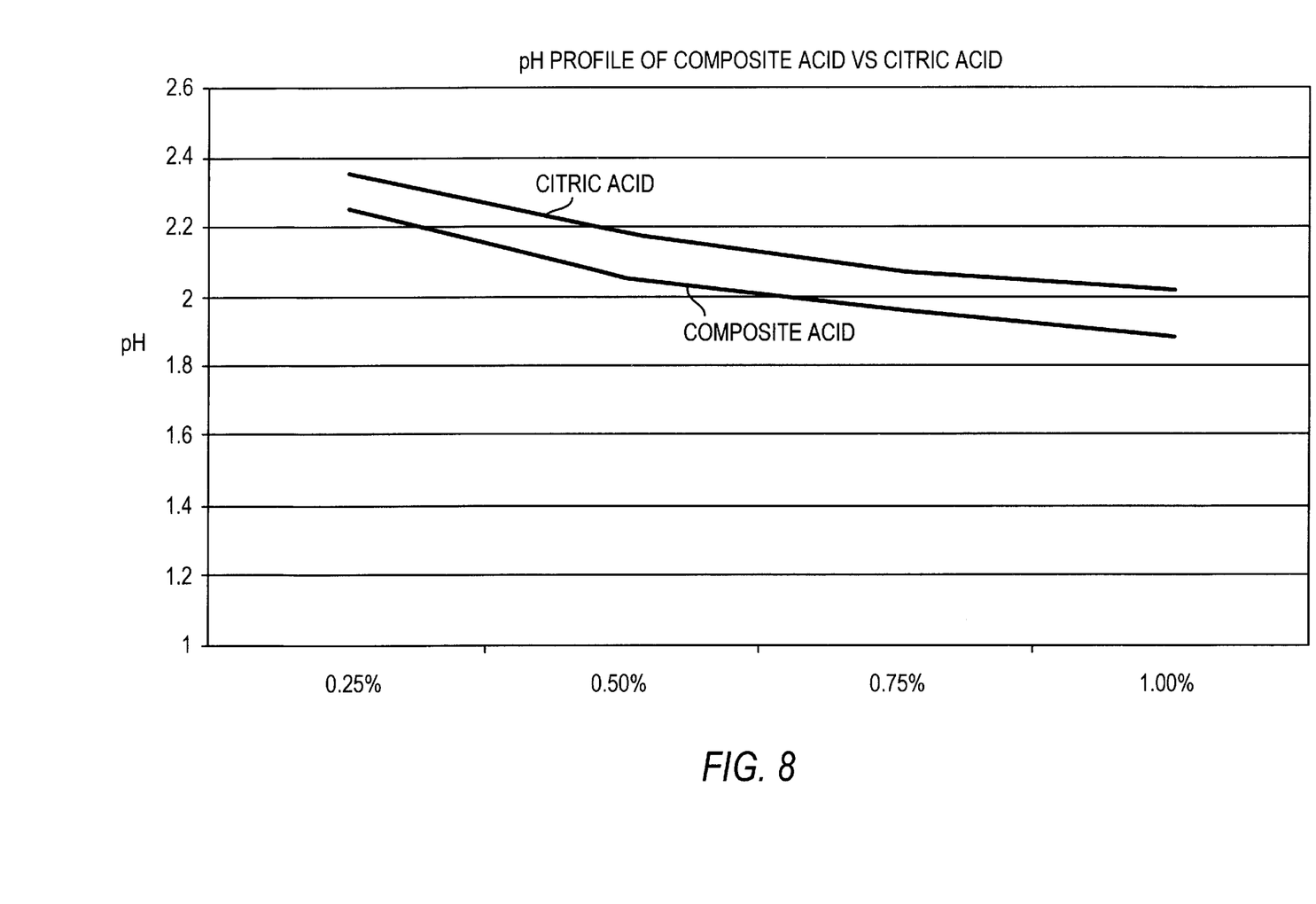
FIG. 8 shows the pH profiles of the composite and citric acid.

It is an advantage of the invention illustrated that it provides a granular solid in which each granule is a composite granule (as opposed to a blend) which contains malic acid, tartaric acid and fumaric acid and in which the granules have a consistent particle size. The product has a good flavour resembling a natural fruit taste with a smooth long-lasting tartness and an even distribution of the various acids within the granulate. It is a further advantage of the invention illustrated that the granular product is free-flowing, dust-free and non-hygroscopic and has improved handling, packaging and shelf-life characteristics when compared with prior art acidulants of which the Applicant is aware and, furthermore, has a smooth long-lasting tartness and a lower cost than prior art food acids of which the Applicant is aware. The pH profile of the composite acid shows a consistently lower pH value at different concentrations than that achieved by citric acid as can be seen in FIG. 8 and Table 3.

TABLE 3 pH of Composite Acid and Citric at Different Concentrations

| SOLUTION (m/v %) SAMPLE | pH value | | | |
|---|---|---|---|---|
| | 0.25% | 0.5% | 0.75% | 1.0% |
| Citric Acid (anhydrous) | 2.35 | 2.18 | 2.07 | 2.02 |
| Composite Acid | 2.25 | 2.05 | 1.96 | 1.88 |

What is claimed is:

1. A method for the production of a granular, free-flowing, non-dusting food acid composition having a preselected taste profile which can be used as a citric acid replacement in a foodstuff, the method including the steps of
   a) combining fumaric acid with an organic acidic material selected from the group consisting of malic acid, tartaric acid, citric acid, lactic acid and ascorbic acid, or mixtures of any two or more thereof, in an aqueous medium to produce a mixture; and
   b) granulating the mixture to produce a food acid comprising a granular product containing the fumaric acid and the organic acidic material, the quantity of the fumaric acid and the quantities of the organic acidic material being selected so that the fumaric acid makes up between 5% and 95% of the granular product, the combining of step a) being selected from one of
   grinding the fumaric acid in an aqueous solution of the organic acidic material to produce a slurry; and
   grinding the fumaric acid in an aqueous medium to produce a milled fumaric acid slurry and then adding the organic acidic material to the milled fumaric acid slurry;
   the granulating of step b) being a spray granulating which is controlled so that the granular product is free-flowing and has a particle size of 20–60 mesh.

2. A method as defined in claim 1, in which the quantity of the fumaric acid and the quantity of the organic acidic material are selected so that the fumaric acid makes up between 40 and 60% of the granular product.

3. A method as defined in claim 2, in which the quantity of the fumaric acid and the quantity of the organic acidic material is selected so that the fumaric acid makes up between 45 and 55% of the granular product.

4. A method as defined in claim 1, in which the fumaric acid is cold water-soluble fumaric acid.

5. A method as defined in claim 1, in which the organic acidic material includes said malic acid and the quantity of the malic acid is selected so that the malic acid makes up 40–60% of the granular product.

6. A method as defined in claim 5, in which the quantity of the malic acid is selected so that the malic acid makes up 50% of the granular product.

7. A method as defined in claim 1, in which the organic acidic material includes said tartaric acid and the quantity of the tartaric acid is selected so that the tartaric acid makes up 3 to 10% of the granular product.

8. A method as defined in claim 7, in which the tartaric acid makes up 5% of the granular product.

9. A method as defined in claim 1, in which the grinding is conducted in a wet mill so that the particle size of essentially all of the solid material in the slurry is not greater than 150 microns or 100 mesh and the average particle size is between 100 and 25 microns or 150–500 mesh.

10. A method as defined in claim 1, in which the grinding is conducted in a wet mill so that the particle size of essentially all of the solid material in the slurry is not greater than 100 microns or 150 mesh and the average particle size is between 75 and 25 microns or 200–500 mesh.

11. A method as defined in claim 1, in which the spray granulating is conducted in a fluid bed granulator by a process selected from continuous and batch processes to give a free-flowing non-dusting product.

12. A method as defined in claim 1, in which the mixture is dried to produce a particulate material having a moisture level of less than 0.5%.

13. A method as defined in claim 12, in which the moisture level is less than 0.25%.

14. A method as defined in claim 1, in which the combining is conducted in the presence of a wetting agent or surfactant.

15. A method as defined in claim 14, in which the wetting agent or surfactant is dissolved in the aqueous medium so that particulate material, which is produced, is uniformly mixed with the wetting agent or surfactant.

16. A method as defined in claim 14, in which the wetting agent or surfactant is a liquid.

17. A method as defined in claim 16, in which the wetting agent or surfactant is selected from the group consisting of dioctyl sodium sulphosuccinate, sodium lauryl sulphate and polyoxyethylene sorbitan monooleate.

18. A method as defined in claim 1, further comprising the step of incorporating an additive selected from the group consisting of flavorants, colorants and sweeteners, or mixtures of any two or more thereof.

* * * * *